United States Patent
Ishii

(10) Patent No.: US 8,542,028 B2
(45) Date of Patent: Sep. 24, 2013

(54) INSPECTION CIRCUIT, ELECTRO-OPTIC DEVICE, AND ELECTRONIC APPARATUS

(75) Inventor: Kenya Ishii, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 737 days.

(21) Appl. No.: 12/405,368

(22) Filed: Mar. 17, 2009

(65) Prior Publication Data

US 2009/0236993 A1  Sep. 24, 2009

(30) Foreign Application Priority Data

Mar. 18, 2008 (JP) ................... 2008-069779
Nov. 17, 2008 (JP) ................... 2008-293060

(51) Int. Cl.
*G01R 31/26* (2006.01)
(52) U.S. Cl.
USPC ........................ 324/760.01; 324/760.02
(58) Field of Classification Search
USPC .............. 324/760.01–760.02, 762.09
See application file for complete search history.

(56) References Cited

U.S. PATENT DOCUMENTS

| | | | | |
|---|---|---|---|---|
| 6,275,061 B1 * | 8/2001 | Tomita | ...... | 324/760.02 |
| 6,630,840 B2 * | 10/2003 | Tomita | ...... | 324/760.02 |
| 6,759,867 B2 * | 7/2004 | Sohn | ...... | 324/750.25 |
| 6,794,892 B2 * | 9/2004 | Matsueda | ...... | 324/760.01 |
| 6,815,975 B2 * | 11/2004 | Nara et al. | ...... | 324/760.02 |
| 6,891,391 B2 * | 5/2005 | Hiroki | ...... | 438/17 |
| 6,982,568 B2 * | 1/2006 | Nojiri et al. | ...... | 324/760.01 |
| 7,199,602 B2 * | 4/2007 | Nara et al. | ...... | 324/762.09 |
| 7,274,352 B2 * | 9/2007 | Yu | ...... | 345/100 |
| 7,385,413 B2 * | 6/2008 | Miyagawa et al. | ...... | 324/750.3 |
| 7,432,451 B2 * | 10/2008 | Yamada | ...... | 174/260 |
| 7,663,396 B2 | 2/2010 | Kawata | | |
| 7,911,217 B2 * | 3/2011 | Nam | ...... | 324/760.01 |
| 8,125,237 B2 * | 2/2012 | Sellathamby et al. | ... | 324/760.02 |
| 8,217,676 B2 * | 7/2012 | Kwak | ...... | 324/760.01 |
| 8,264,661 B2 * | 9/2012 | Jeoung et al. | ...... | 349/192 |
| 8,324,916 B2 * | 12/2012 | Hayashi | ...... | 324/750.3 |
| 8,324,920 B2 * | 12/2012 | Hata et al. | ...... | 324/760.01 |
| 8,378,708 B2 * | 2/2013 | Jun et al. | ...... | 324/762.01 |
| 8,415,966 B2 * | 4/2013 | Kim et al. | ...... | 324/760.01 |
| 2004/0239598 A1 * | 12/2004 | Koyama | ...... | 345/76 |
| 2005/0041488 A1 * | 2/2005 | Ito et al. | ...... | 365/199 |
| 2007/0176623 A1 * | 8/2007 | Miyake | ...... | 324/770 |
| 2008/0079711 A1 * | 4/2008 | Ishii | ...... | 345/215 |
| 2008/0129327 A1 * | 6/2008 | Kim | ...... | 324/770 |
| 2009/0250250 A1 * | 10/2009 | Ishii | ...... | 174/254 |

FOREIGN PATENT DOCUMENTS

| | | |
|---|---|---|
| JP | 11-338376 | 12/1999 |
| JP | 2003-029296 | 1/2003 |
| JP | 2005227505 A | 8/2005 |
| JP | 2007-079541 | 3/2007 |
| JP | 2007-206440 A | 8/2007 |

* cited by examiner

*Primary Examiner* — Joshua Benitez-Rosario
(74) *Attorney, Agent, or Firm* — Maschoff Brennan

(57) ABSTRACT

An inspection circuit for inspecting an electro-optic device that includes a data line, a scanning line, a pixel portion, a driving circuit, and a first terminal portion through which a first power supply voltage is supplied to the driving circuit. The inspection circuit includes an inspection line electrically connected to an inspection unit inspecting the pixel portion, a connection circuit electrically connecting the inspection line to the data line, and a supply circuit supplying a control signal for controlling conduction between the data line and the inspection line to the connection circuit. The supply circuit is driven using a second power supply voltage supplied through a second terminal portion.

6 Claims, 6 Drawing Sheets

INSPECTION CIRCUIT, ELECTRO-OPTIC DEVICE, AND ELECTRONIC APPARATUS

BACKGROUND

1. Technical Field

The present invention relates to a technical field of an inspection circuit for inspecting an electro-optic device, e.g., a liquid crystal display device, an electro-optic device, such as a liquid crystal display device, including the inspection circuit, and an electronic apparatus, such as a projector.

2. Related Art

In this type of electro-optic device, generally, inspection to determine the presence or absence of a defect is performed during manufacture in order to prevent the defect from seriously affecting post-processing. In particular, in an active matrix electro-optic device, since active elements, such as transistors, for switching pixels are arranged in an element substrate, it is important to determine the presence or absence of such a defect.

Furthermore, in a driving circuit built-in electro-optic device, since part or the whole of the driving circuit is formed together with active elements for switching pixels in an element substrate, greater importance is being placed on inspection and the need for inspection also intensifies. In response to the need for a technique of inspecting such an electro-optic device, there are proposed an electro-optic device with an inspection circuit and an inspecting method which can be performed by the inspection circuit, the device and method being disclosed in JP-A-2007-79541.

In an electro-optic device, assuming that a driving circuit, driven during display of an image, and an inspection circuit are driven using a common power supply voltage, the inspection circuit consumes power while the electro-optic device displays an image, namely, while the inspection circuit does not operate. Disadvantageously, energy is wasted. In addition, when the inspection circuit is supplied with a power supply voltage while not operating, a clock signal for operating the inspection circuit becomes unstable. This may cause a malfunction of the electro-optic device. More specifically, a display defect, such as crosstalk, may be generated.

SUMMARY

An advantage of some aspects of the invention is to provide an inspection circuit capable of reducing its power consumption and also reducing a malfunction of an electro-optic device, an electro-optic device including the inspection circuit, and an electronic apparatus.

According to an aspect of the invention, there is provided an inspection circuit for inspecting an electro-optic device that includes a data line and a scanning line arranged so as to intersect each other, a pixel portion disposed so as to correspond to the intersection of the data line and the scanning line, a driving circuit supplying a signal to the pixel portion, and a first terminal portion through which a first power supply voltage is supplied to the driving circuit. The inspection circuit includes an inspection line electrically connected to an inspection unit inspecting the pixel portion, a connection circuit electrically connecting the inspection line to the data line, and a supply circuit supplying a control signal for controlling conduction between the data line and the inspection line to the connection circuit. The supply circuit is driven using a second power supply voltage supplied through a second terminal portion different from the first terminal portion.

In the inspection circuit according to this aspect of the invention, the connection circuit can electrically connect the inspection line for the pixel portion to the data line. During inspection of the electro-optic device, a potential of the data line electrically connected to the pixel portion is read out through the inspection line.

The supply circuit supplies the control signal for controlling the conduction between the data line and the inspection line to the connection circuit. During inspection of the electro-optic device, the supply circuit is driven using the second power supply voltage supplied through the second terminal portion different from the first terminal portion. Therefore, during operation of the electro-optic device during which the electro-optic device displays an image, while the supply circuit is not supplied with the second power supply voltage, the driving circuit is driven using the first power supply voltage to display the image.

In the inspection circuit according to this aspect of the invention, therefore, since the second power supply voltage is supplied to the supply circuit only during inspection of the electro-optic device, power consumed by the inspection circuit can be reduced during operation of the electro-optic device.

In addition, since the first terminal portion through which the first power supply voltage is supplied is physically separated from the second terminal portion through which the second power supply voltage is supplied, the first power supply voltage can be reliably prevented from being supplied to the supply circuit. More specifically, for example, during operation of an electro-optic device having a structure in which a driving circuit and a supply circuit share a common terminal portion through which a driving power supply voltage is supplied, when a switching element is used to switch between power supply destinations, the power supply voltage for the driving circuit may be supplied to the supply circuit depending on the electrical connection state among the terminal portion, the switching element, the driving circuit, and the supply circuit. It is therefore difficult to reliably reduce power consumed by the supply circuit.

In the inspection circuit according to this aspect of the invention, the first terminal portion through which the first power supply voltage is supplied is physically separated from the second terminal portion through which the second power supply voltage is supplied. For example, therefore, a supply unit supplying the second power supply voltage is not electrically connected to the second terminal portion during operation of the electro-optic device, so that power consumed by the inspection circuit can be reliably reduced.

During inspection of the electro-optic device, the supply circuit, driven using the second power supply voltage, supplies the control signal for controlling the conduction between the data line and the inspection line to the connection circuit, so that the data line and the inspection line can be brought into conduction. Thus, the pixel portion can be inspected.

In the inspection circuit according to this aspect of the invention, since the second power supply voltage is not supplied to the supply circuit during operation of the electro-optic device, the electro-optic device can be prevented from malfunctioning due to an unstable state of a clock signal for the inspection circuit during non-operation of the inspection circuit. Thus, the occurrence of a display defect, such as crosstalk, can be reduced.

A line for supplying a clock signal to the supply circuit is floating after inspection of the electro-optic device. Accordingly, if the line is charged with static electricity, the electro-optic device may malfunction due to the static electricity influenced through the inspection circuit. In the inspection circuit according to this aspect of the invention, since the second power supply voltage is not supplied to the supply circuit during operation of the electro-optic device, the electro-optic device can be prevented from being affected by the static electricity through the inspection circuit. Thus, the display performance of the electro-optic device is not degraded.

Advantageously, the inspection circuit according to the aspect of the invention can inspect the electro-optic device and also reduce its power consumption. In addition, in the use of the inspection circuit according to the aspect, a display defect caused by a malfunction of the electro-optic device can also be reduced. The display performance of the electro-optic device can be increased higher than that in the case where the driving circuit and the supply circuit share a single power supply circuit.

It is preferable that the connection circuit include a transistor electrically connected between the data line and the inspection line, and a control circuit having an input terminal electrically connected to the first power supply voltage and the supply circuit and an output terminal electrically connected to the gate of the transistor.

In this case, the transistor is, for example, an n-channel TFT and is electrically connected between the data line and the inspection line.

The control circuit includes, for example, a complementary transistor circuit having an input terminal electrically connected to a resistor. The input terminal of the control circuit is electrically connected to the first power supply voltage and the supply circuit. The output terminal thereof is electrically connected to the gate of the transistor.

In the control circuit, while the control signal is not supplied from the supply circuit to the input terminal, namely, during operation of the electro-optic device, a voltage lower than a threshold voltage of the n-channel transistor is applied to the gate thereof, so that the data line and the inspection line are brought into non-conduction. Therefore, the inspection circuit can be electrically disconnected from the data line during operation of the electro-optic device. Even when the inspection circuit operates unstably, the display performance of the electro-optic device in image display is not degraded.

On the other hand, during inspection of the electro-optic device, when the control signal is supplied from the supply circuit to the input terminal of the control circuit, the first power supply voltage is supplied to the gate of the n-channel transistor through an inverter circuit, so that the data line and the inspection line are brought into conduction. Thus, the pixel portion can be inspected.

In this case, therefore, the state between the inspection circuit and the pixel portion can be switched between conduction and non-conduction during each of operation and inspection modes of the electro-optic device. During inspection, the inspection circuit can be electrically disconnected from the pixel portion with reliably. Thus, the power consumption of the inspection circuit can be reduced and the display performance of the electro-optic device in image display can be prevented from being degraded.

It is preferable that the inspection line include a line for determination electrically connected to a determination unit determining the quality of the pixel portion.

In this case, the connection circuit can electrically connect the determination line, electrically connected to the determination unit determining the quality of the pixel portion, to the data line. During inspection of the electro-optic device, a potential of the data line electrically connected to the pixel portion can be read out through the determination line. The determination unit determines the quality of the pixel portion on the basis of the read-out potential, thus inspecting the electro-optic device.

According to another aspect of the invention, there is provided an electro-optic device including a data line and a scanning line arranged on a substrate so as to intersect each other, a pixel portion disposed so as to correspond to the intersection of the data line and the scanning line, a driving circuit supplying a signal to the pixel portion, and an inspection circuit. The inspection circuit includes an inspection line electrically connected to an inspection unit inspecting the pixel portion, a connection circuit electrically connecting the inspection line to the data line, and a supply circuit supplying a control signal for controlling conduction between the data line and the inspection line to the connection circuit, the supply circuit being driven using a second power supply voltage supplied through a second terminal portion different from a first terminal portion.

In this case, since the electro-optic device includes the above-described inspection circuit, the total consumption of electric power during inspection of the electro-optic device and that during operation thereof can be reduced. In addition, a display defect caused by a malfunction of the electro-optic device can also be reduced. Thus, the display performance of the electro-optic device can be increased higher than that in a case where the driving circuit and the supply circuit share a single power supply circuit.

According to another aspect of the invention, there is provided an electronic apparatus including the electro-optic device according to the foregoing aspect.

Since the electronic apparatus according to this aspect includes the electro-optic device according to the foregoing aspect, various electronic apparatuses, e.g., a projection display device, a mobile phone, an electronic organizer, a word processor, view-finder type and monitor-direct-view type video tape recorders, a workstation, a video phone, a POS terminal, and a touch panel can be realized. In addition, for example, an electrophoresis device, such as electronic paper, can be realized as the electronic apparatus according to this aspect.

The above and other features and advantages will be apparent from the following description of preferred embodiments of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

An inspection circuit according to an embodiment of the invention, an electro-optic device according to another embodiment of the invention, and an electronic apparatus according to another embodiment of the invention will be described below with reference to FIGS. 1 to 8. In the following embodiments, a TFT active matrix driving liquid crystal display device will be described as an example of the electro-optic device according to the embodiment of the invention.

Liquid Crystal Display Device and Inspection Circuit

The liquid crystal display device and the inspection circuit mounted on the liquid crystal display device according to the embodiments will be described with reference to FIGS. 1 to 7. In the embodiments, the inspection circuit is mounted on the liquid crystal display device.

Figure 1:
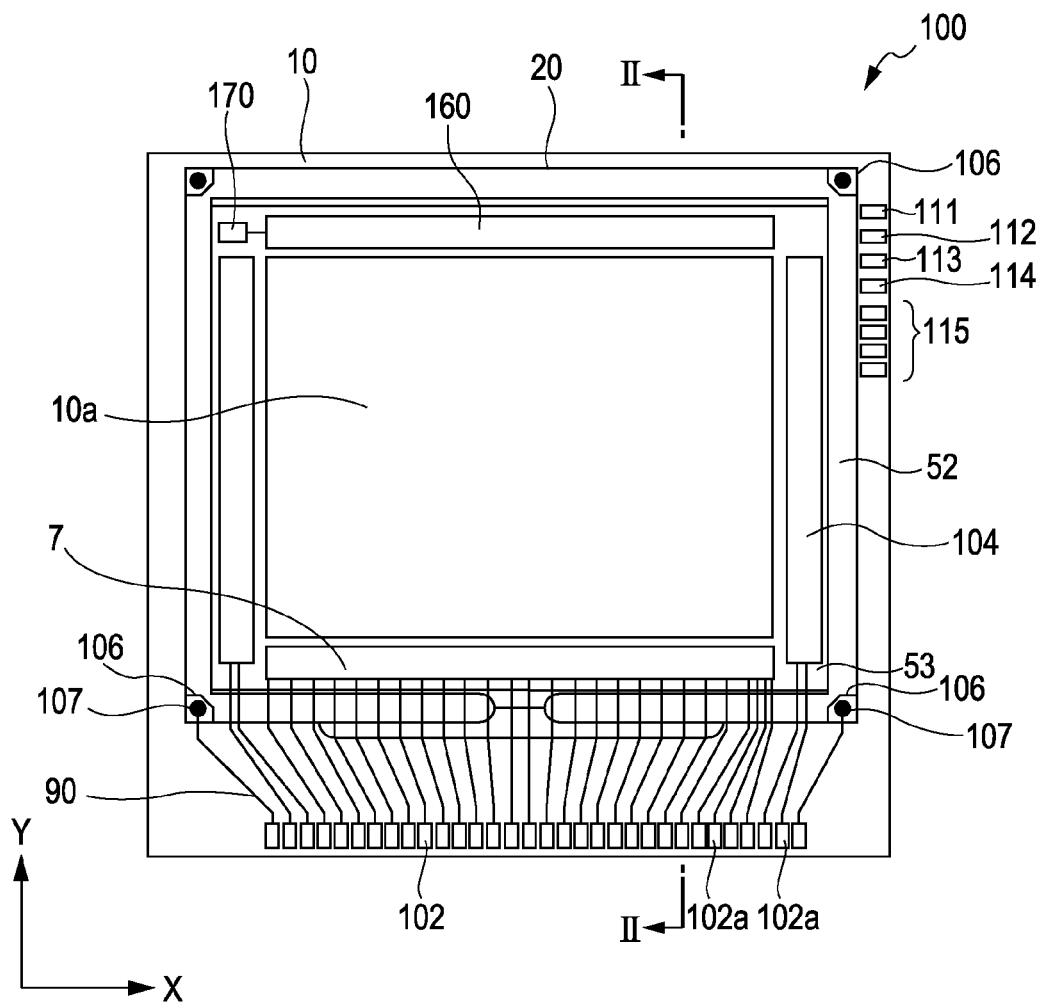
FIG. 1 is a plan view of the entire structure of a liquid crystal display device according to an embodiment of the invention.
Figure 2:
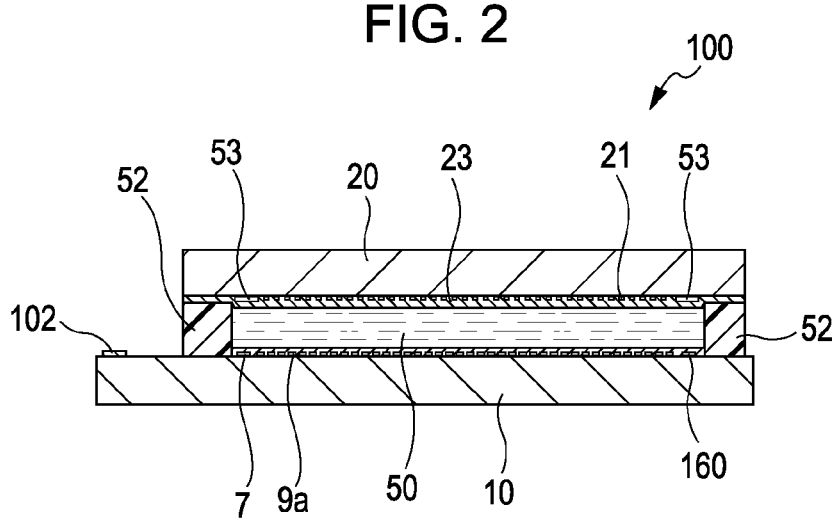
FIG. 2 is a cross-sectional view of the liquid crystal display device taken along the line II-II in FIG. 1.

First, the entire structure of the liquid crystal display device, indicated at 100, according to the embodiment will be described with reference to FIGS. 1 and 2. FIG. 1 is a plan view of the entire structure of the liquid crystal display device 100 according to the embodiment. FIG. 2 is a cross-sectional view of the display device taken along the line II-II in FIG. 1.

Referring to FIGS. 1 and 2, the liquid crystal display device 100 includes an element substrate 10 and an opposite substrate 20 such that the substrates face each other. A liquid crystal layer 50 is sealed in the space between the element substrate 10 and the opposite substrate 20 such that the element substrate 10 is bonded to the opposite substrate 20 with a seal 52 disposed in a seal area surrounding an image display area 10a.

Referring to FIG. 1, a frame-shaped light-shielding layer 53 defining a frame portion of the image display area 10a is provided on the opposite substrate 20 such that the layer 53 is located in parallel to the inner periphery of the seal area where the seal 52 is disposed. In a peripheral area outside the seal area where the seal 52 is disposed, external-circuit connection terminals 102 including data signal terminals supplied with data signals are arranged along a first side of the element substrate 10. A demultiplexer 7 is disposed inside the seal area on the first side such that the demultiplexer 7 is covered with the frame-shaped light-shielding layer 53. A scanning line driving circuit 104 is disposed inside the seal area along each of two sides next to the first side such that the driving circuit is covered with the frame-shaped light-shielding layer 53. Furthermore, the inspection circuit, indicated at 160, is disposed inside the seal area along one side opposed to the first side such that the inspection circuit is covered with the frame-shaped light-shielding layer 53. In addition, an inspection PAD 170 electrically connected to the inspection circuit 160 is disposed such that the PAD is covered with the frame-shaped light-shielding layer 53. In this embodiment, a shift register 162 (refer to FIG. 3) included in the inspection circuit 160 can be inspected through the inspection PAD 170.

On the element substrate 10, four vertical conduction terminals 106 for connecting the two substrates with a vertical conduction material 107 are arranged such that the terminals are opposed to the four corners of the opposite substrate 20, respectively. These terminals allow for electrical conduction between the element substrate 10 and the opposite substrate 20.

On the element substrate 10, lines 90 for electrically connecting the external-circuit connection terminals 102, the demultiplexer 7, the scanning line driving circuits 104, and the vertical conduction terminals 106 are arranged. The external-circuit connection terminals 102 include connection terminals 102a, each serving as an example of a first terminal portion. The connection terminals 102a are electrically connected to a power supply circuit that supplies a power supply voltage VDDY, serving as an example of a first power supply voltage, to the scanning line driving circuit 104 serving as an example of a driving circuit.

The liquid crystal display device 100 has inspection terminals 111, 112, 113, 114, and 115 in addition to the external-circuit connection terminals 102 such that the inspection terminals are arranged on the side next to the first side, along which the external-circuit connection terminals 102 are arranged, of the element substrate 10. The inspection terminal 111, serving as an example of a second terminal portion, is physically separated from the connection terminals 102a on the element substrate 10. During inspection of the liquid crystal display device 100, the inspection terminal 111 is electrically connected to a power supply circuit that supplies a power supply voltage VDDC (refer to FIG. 3). The inspection terminals 112, 113, and 114 are used to supply a clock signal CLX, a start pulse DX, and the power supply voltage VDDY to a connecting circuit 163, respectively. The power supply voltage VDDC may be used as a power supply voltage VDDX for driving a data signal supply circuit 400 which will be described later.

Referring to FIG. 2, a laminate is provided on the element substrate 10. The laminate includes pixel-switching thin film transistors (TFTs), serving as driving elements, and lines such as scanning lines and data lines. In the image display area 10a, pixel electrodes 9a are arranged on the pixel switching TFTs and the lines such as the scanning lines and the data lines. The pixel electrodes 9a are overlaid with an alignment layer. On the other hand, a light-shielding layer 23 is disposed on one surface of the opposite substrate 20 facing the element substrate 10. On the light-shielding layer 23, counter electrodes 21 made of a transparent material, e.g., indium tin oxide (ITO) are arranged such that the counter electrodes 21 face the pixel electrodes 9a. The counter electrodes 21 are overlaid with an alignment layer. The liquid crystal layer 50 comprises a single type or a mixture of different types of nematic liquid crystal. The liquid crystal has a predetermined alignment state between the pair of alignment layers.

Figure 3:
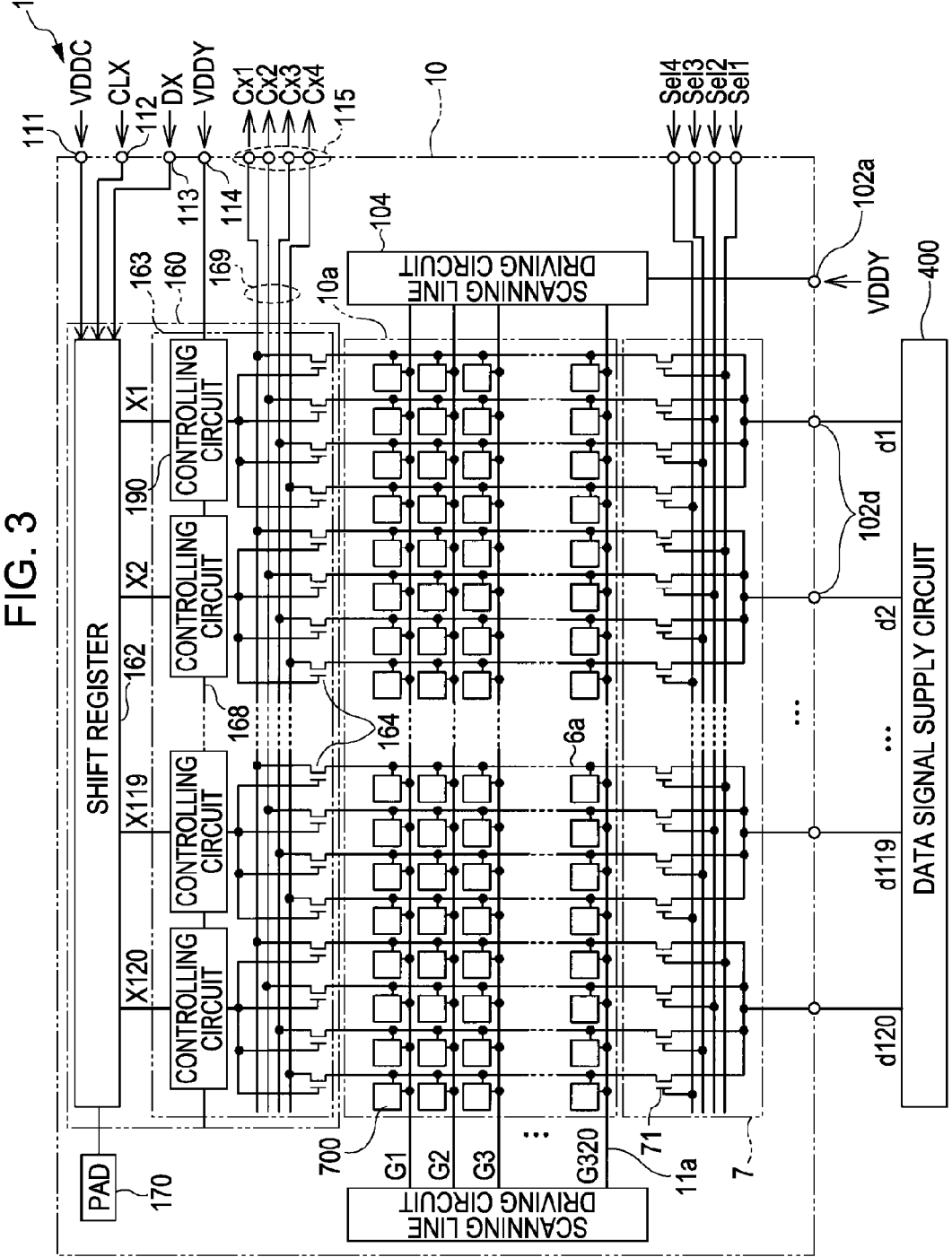
FIG. 3 is a block diagram of the electrical structure of the liquid crystal display device according to the embodiment.
Figure 4:
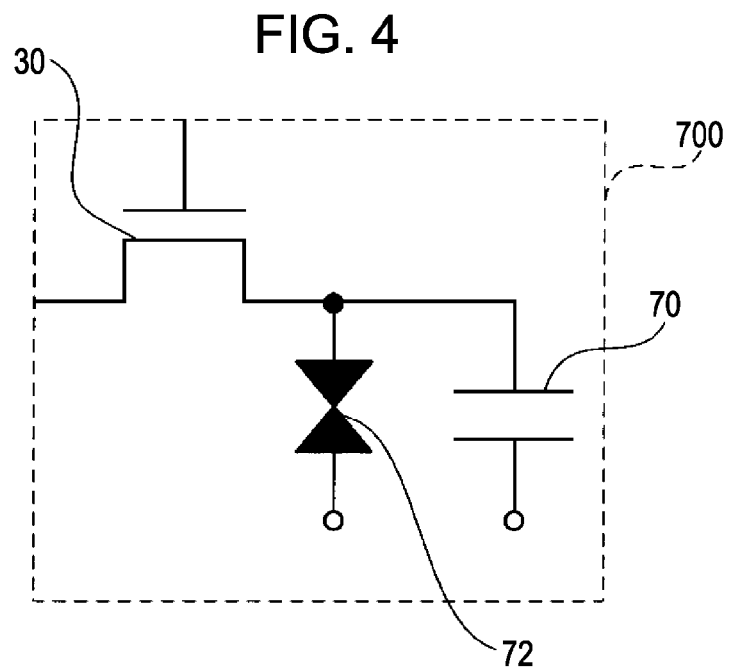
FIG. 4 is an equivalent circuit diagram of a pixel unit in the liquid crystal display device according to the embodiment.
Figure 5:
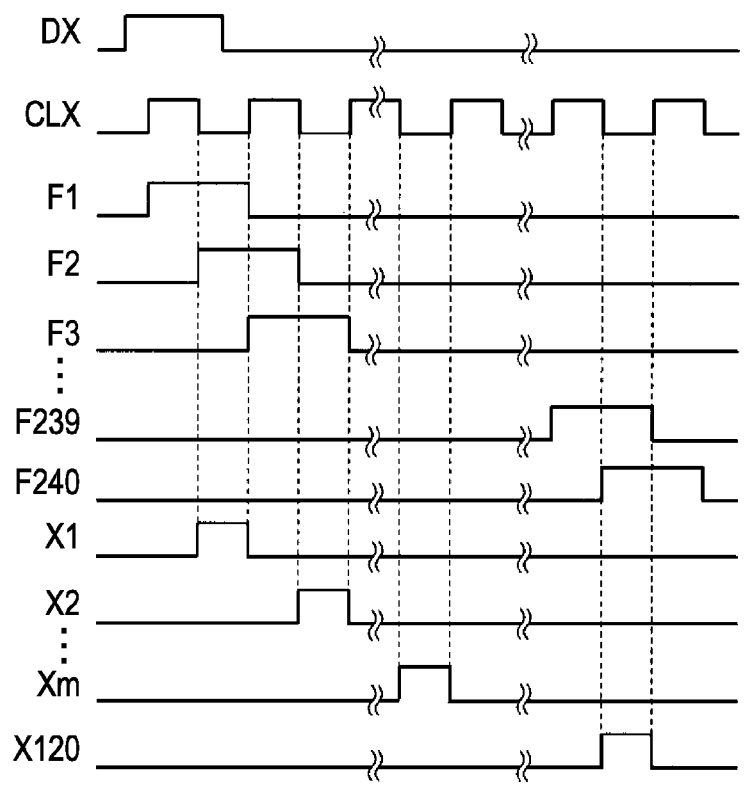
FIG. 5 is a timing chart illustrating an operation of a shift register included in an inspection circuit according to an embodiment of the invention.
Figure 6:
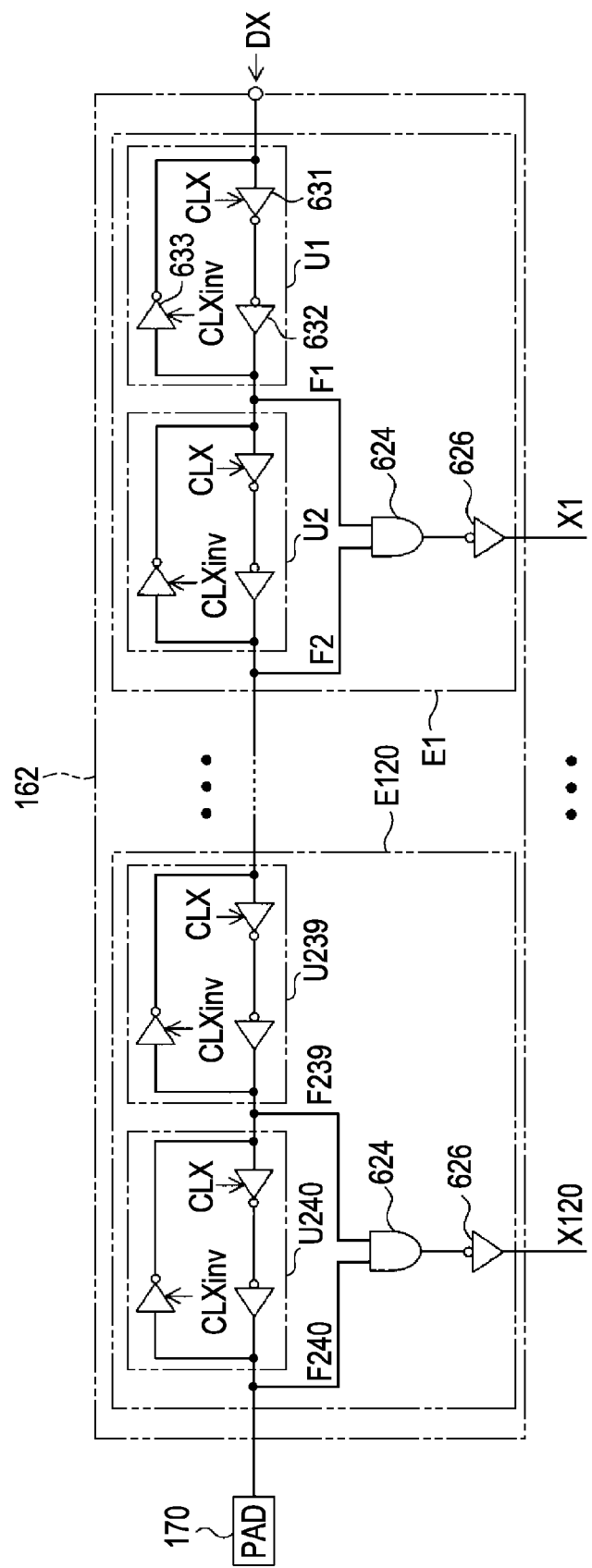
FIG. 6 is a circuit diagram of the configuration of the shift register in the inspection circuit according to the embodiment.
Figure 7:
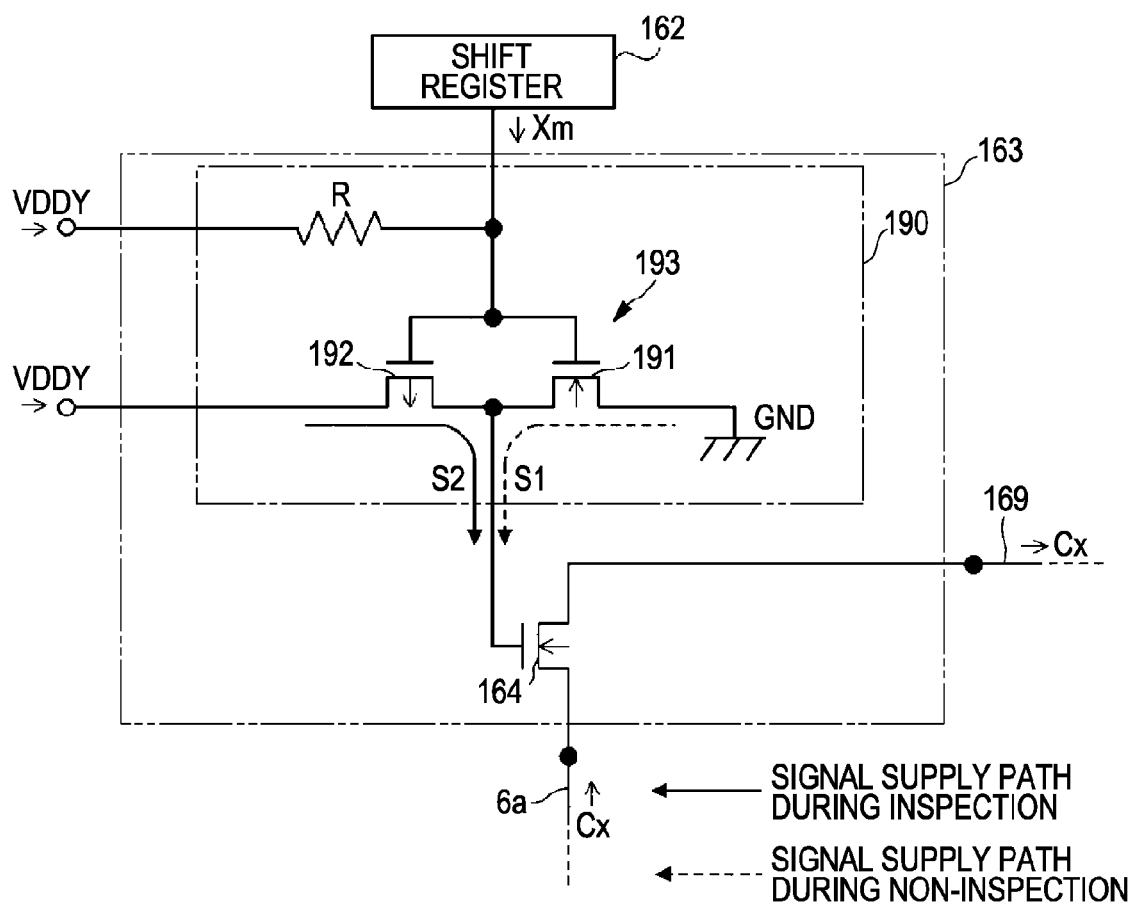
FIG. 7 is a circuit diagram of the circuit configuration of a connecting circuit included in the inspection circuit according to the embodiment.

The electrical structure of the liquid crystal display device 100 will now be described with reference to FIGS. 3 to 7. FIG. 3 is a block diagram illustrating the electrical structure of the liquid crystal display device 100 according to the embodiment. FIG. 4 is an equivalent circuit diagram of a pixel portion of the liquid crystal display device according to the embodiment. FIG. 5 is a timing chart illustrating the operation of the shift register included in the inspection circuit mounted on the liquid crystal display device according to the embodiment. FIG. 6 is a circuit diagram of the configuration of the shift register in the inspection circuit on the liquid crystal display device according to the embodiment. FIG. 7 is a circuit diagram illustrating the configuration of the connecting circuit included in the inspection circuit on the liquid crystal display device according to the embodiment in addition to the shift register.

Referring to FIG. 3, the liquid crystal display device 100 includes the demultiplexer 7, the scanning line driving circuits 104, and the inspection circuit 160 which are arranged on the element substrate 10. The data signal supply circuit 400, serving as an external circuit, is connected to data signal terminals 102d included in the external-circuit connection terminals 102 on the element substrate 10.

In the image display area 10a on the element substrate 10, 320 scanning lines 11a are arranged so as to extend in the row direction (i.e., the X direction). In addition, 480 (=120×4) data lines 6a are arranged so as to extend in the column direction (i.e., the Y direction) such that four data lines 6a constitute one block and the data lines 6a are electrically isolated from the respective scanning lines 11a. The number of scanning lines 11a is not limited to 320 and that of data lines 6a is not limited to 480. Although the number of data lines constituting one block is four in this embodiment, the number of data lines for each block may be two or more.

Pixel units 700 are arranged so as to correspond to the respective intersections of the 320 scanning lines 11a and the 480 data lines 6a. In this embodiment, therefore, the pixel units 700 are arranged in a matrix of 320 rows×480 columns at a predetermined pixel pitch.

Referring to FIG. 4, each pixel unit 700 includes a pixel switching TFT 30, a liquid crystal element 72, and a storage capacitor 70.

The pixel switching TFT 30 has a source electrically connected to the data line 6a, a gate electrically connected to the scanning line 11a, and a drain electrically connected to the pixel electrode 9a of the liquid crystal element 72 which will be described later. The pixel switching TFT 30 is switched between the ON state and the OFF state in accordance with a scanning signal supplied from the scanning line driving circuit 104.

The liquid crystal element 72 includes the pixel electrode 9a, the counter electrode 21, and the liquid crystal disposed between the pixel electrode 9a and the counter electrode 21. In the liquid crystal element 72, a data signal, written in the liquid crystal through the data line 6a and the pixel electrode 9a, at a predetermined level is held between the pixel electrode 9a and the counter electrode 21 for a predetermined period. The alignment or order of liquid crystal molecular assembly varies depending on the level of voltage applied, so that the liquid crystal modulates light to achieve gray-scale display. In the normally white mode, the transmittance ratio of the outgoing light quantity to the incident light quantity is reduced in accordance with a voltage applied to each pixel unit. In the normally black mode, the transmittance ratio is increased in accordance with a voltage applied to each pixel unit. Consequently, light with contrast according to data signals emerges from the liquid crystal display device serving as the electro-optic device.

In order to prevent leakage of the held data signal, the storage capacitor 70 is additionally arranged in parallel to a liquid crystal capacitor formed between the pixel electrode 9a and the counter electrode 21.

The above-described pixel units 700 are arranged in the matrix in the image display area 10a, so that active matrix driving can be achieved.

In this embodiment, the four data lines 6a constituting each block will be called the "a", "b", "c", and "d" data lines in that order from the right in FIG. 3 to distinguish the data lines 6a from one another. More specifically, the "a" data lines include the first, fifth, ninth, . . . , and 477th data lines 6a. The "b" data lines include the second, sixth, tenth, . . . , and 478th data lines 6a. The "c" data lines include the third, seventh, eleventh, . . . , and 479th data lines 6a. The "d" data lines include the fourth, eighth, twelfth, . . . , and 480th data lines 6a.

The scanning line driving circuits 104 supply scanning signals G1, G2, G3, . . . , and G320 to the first, second, third, . . . , and 320th scanning lines 11a, respectively. Specifically, the scanning line driving circuits 104 sequentially select the first, second, third, . . . , and 320th scanning lines 11a every frame such that a scanning signal supplied to the selected scanning line is held at a high level (level "H") corresponding to a selected voltage and the other scanning signals supplied to the other scanning lines are held at a low level (level "L") corresponding to an unselected voltage.

The data signal supply circuit 400 is separated from the element substrate 10. During operation of the liquid crystal display device 100, namely, while the liquid crystal display device 100 performs a display operation, the data signal supply circuit 400 is electrically connected to the element substrate 10 through the data signal terminals 102d included in the external-circuit connection terminals 102. The data signal supply circuit 400 outputs a data signal held at a voltage according to a pixel gray scale level to the pixel unit 700 corresponding to the intersection of the scanning line 11a selected by the scanning line driving circuits 104 and the data line 6a selected from the four data lines 6a, belonging to the block, by the demultiplexer 7. On the other hand, during inspection of the liquid crystal display device 100, a probe is connected instead of the data signal supply circuit 400 and the probe supplies a data signal according to an inspection operation.

In this embodiment, the number of data lines 6a is 480 and the 480 data lines 6a are divided into the blocks each including four data lines as described above. Accordingly, the number of data signal terminals 102d is 120.

The demultiplexer 7 includes TFTs 71 arranged for the respective data lines 6a. In this instance, the TFTs 71 are of the n-channel type. The drain of each TFT 71 is electrically connected to one end of the corresponding data line 6a. The sources of four TFTs 71 corresponding to the data lines 6a belonging to the same block are connected in common to receive a data signal assigned to the block.

Specifically, since the mth (m is an integer ranging from 1 to 120) block includes the "a", or (4m−3)th data line 6a, the "b", or (4m−2)th data line 6a, the "c", or (4m−1)th data line 6a, and the "d", or (4m)th data line 6a, the sources of the TFTs 71 corresponding to the four data lines 6a are connected in common to receive a data signal d(m). The gate of the TFT 71 corresponding to the (4m−3)th data line 6a is supplied with a control signal Sel1. Similarly, the gates of the TFTs 71 corresponding to the (4m−2)th, (4m−1)th, and (4m)th data lines 6a are supplied with control signals Sel2, Sel3, and Sel4, respectively. The control signals Sel1, Sel2, Sel3, and Sel4 are supplied through the external-circuit connection terminals 102 from a timing control circuit (not shown) which serves as an external circuit.

Referring to FIG. 3, the inspection circuit 160 includes the shift register 162, serving as an example of a supply circuit, and the connecting circuit 163. The connecting circuit 163 includes TFTs 164, each serving as an example of a transistor, and controlling circuits 190, each serving as an example of a control circuit.

The connecting circuit 163 is disposed between four determination lines 169, each serving as an example of an inspection line, and the data lines 6a so as to be electrically connected to these lines. The operation of the connecting circuit 163, namely, the operation of controlling conduction between the determination lines 169 and the data lines 6a and non-conduction therebetween is controlled in accordance with a transfer pulse signal Xm output from the shift register 162 to the connecting circuit 163.

During inspection of the liquid crystal display device 100, the connecting circuit 163 brings the determination lines 169 into conduction with the data lines 6a. The determination lines 169 are electrically connected through the inspection terminals 115 to a determination circuit (not shown) serving as an example of an external inspection unit (determination unit). Output signals Cx1 to Cx4 output from the pixel units 700 in response to inspection data signals are output through the data lines 6a, the connecting circuit 163, and the determination lines 169, respectively. The determination circuit electrically connected to the inspection terminals 115 determines the qualities of the pixel units 700 on the basis of potentials of the output signals Cx1 to Cx4. Consequently, the quality of the liquid crystal display device 100 is determined, namely, the liquid crystal display device 100 is inspected.

During inspection of the liquid crystal display device 100, the shift register 162 is driven using the power supply voltage VDDC. The power supply voltage VDDC is supplied through the inspection terminal 111 different from the connection terminal 102a, through which the power supply voltage VDDY for driving the scanning line driving circuits 104 is supplied, and is different from the power supply voltage VDDY. The power supply circuit is electrically connected to the inspection terminal 111 only when the liquid crystal display device 100 is inspected, so that the power supply voltage VDDC is supplied to the shift register 162 only during inspection of the liquid crystal display device 100.

In the liquid crystal display device 100, therefore, during the operation of the liquid crystal display device 100, namely, in the operation in which the liquid crystal display device 100 displays an image, the scanning line driving circuits 104 are driven using the power supply voltage VDDY so that the image can be displayed while the shift register 162 is not supplied with the power supply voltage VDDC. Consequently, power consumed by the shift register 162 can be reduced during the operation of the liquid crystal display device 100.

Assuming that the scanning line driving circuits 104 and the shift register 162 share a terminal through which a driving power supply voltage is supplied, when any one of supply destinations for the power supply voltages VDDY and VDDC is switched to the other one by a switching element during the operation of the liquid crystal display device 100, the power supply voltage VDDY may be supplied to the shift register 162 in accordance with the electrical connection state among the terminal, the switching element, the scanning line driving circuits 104, and the shift register 162. It is therefore difficult to reliably reduce the power consumption of the shift register 162.

The connection terminals 102a through which the power supply voltage VDDY is supplied are physically separated from the inspection terminal 111 through which the power supply voltage VDDC is supplied. In the inspection circuit 160, the power supply circuit that supplies the power supply voltage VDDC is not electrically connected to the inspection terminal 111 during operation of the liquid crystal display device 100. Advantageously, the power supply voltage VDDY is not supplied to the shift register 162, so that the power consumption of the shift register 162 can be reliably reduced.

As shown in FIGS. 3 and 5, during inspection of the liquid crystal display device 100, the shift register 162 sequentially shifts the transfer start pulse DX, which is supplied through the inspection terminal 113 from an inspection control circuit (not shown), in accordance with the clock signal CLX supplied through the inspection terminal 112 to output transfer pulses X1, X2, . . . , and X120, each serving as an example of a control signal, to the respective blocks.

The configuration of the shift register 162 and the operation thereof will now be described with reference to FIG. 6.

Referring to FIG. 6, the shift register 162 includes 120 unit circuits Ei (i ranges from 1 to 120) connected in multiple stages (or in cascade). Each unit circuit Ei includes two latch circuit Uk and Uk+1 (k=2i−1, i=1, . . . , or 120), a logic circuit 624 and a buffer circuit 626. The latch circuits Uk and Uk+1, the logic circuit 624, and the buffer circuit 626 are driven using the power supply voltage VDDC as a driving power supply voltage during inspection of the liquid crystal display device 100.

The latch circuits Uk and Uk+1 each include inverters 631, 632, and 633. When the clock signal CLX is at the level "H", the inverter 631 inverts the logic level of an input signal and outputs the inverted signal. When the clock signal CLX is at the level "L", the inverter 631 enters a high impedance mode. The inverter 632 functions as merely a NOT circuit. When a clock signal CLXinv logically inverted from the clock signal CLX is at the level "H", the inverter 633 inverts the logic level of an input signal and outputs the inverted signal. When the clock signal CLXinv is at the level "L", the inverter 633 enters the high impedance mode. The latch circuits Uk and Uk+1 are connected to each other so that an output signal from the latch circuit Uk becomes an input signal of the latch circuit Uk+1. Specifically, the latch circuits U1, . . . , and U240 are connected in multiple stages.

Again referring to FIG. 5, the latch circuits U1, U2, . . . , and U240 having the above-described configuration output shift signals F1, F2, . . . , and F240 obtained by sequentially shifting the transfer start pulse DX, respectively. The shift signal F1 output from the latch circuit U1 is a forward (non-inverted) output of the transfer start pulse DX while the clock signal CLX is at the level "H". Whereas, while the clock signal CLX is at the level "L", the shift signal F1 is a latched (or held) forward output obtained by latching the preceding forward output. A signal F2 output from the latch circuit U2 is a forward output of the shift signal F1 while the clock signal CLX is at the level "L" and is a latched forward output obtained by latching the preceding forward output while the clock signal CLX is at the level "H". The same applies to the subsequent latch circuits U3, U4, . . . and U240. In other words, the shift signals F1, 2 . . . and F240 are obtained by sequentially shifting the clock signal CLX (or the clock signal CLXinv) by a half period.

The logic circuit 624 is configured to output an AND signal of shift signals Fk and Fk+1 from the latch circuits Uk and Uk+1.

The buffer circuit 626 increases the driving capability of the AND signal supplied from the logic circuit 624 and outputs the resultant signal as a transfer pulse X1. Since the shift register 162 has the above-described configuration, the inspection control circuit determines how many clock signals CLX have been supplied after output of the transfer start pulse DX to the shift register 162, thereby grasping which shift signal becomes the level "H".

Since the shift register 162 is not supplied with the power supply voltage VDDC during operation of the liquid crystal display device 100, the liquid crystal display device 100 can be prevented from malfunctioning due to an unstable state of a clock signal for the inspection circuit 160 during non-operation of the inspection circuit 160, more specifically, upon non-operation of the shift register 162. Accordingly, a display defect, such as crosstalk, generated in the liquid crystal display device 100 caused by a malfunction of the inspection circuit 160 can be reduced.

In addition, since the line for supplying the clock signal CLX to the shift register 162 is floating after inspection of the liquid crystal display device 100, a malfunction may occur in the liquid crystal display device 100 through the inspection circuit 160 when the line is charged with static electricity.

In the inspection circuit 160, however, since the shift register 162 is not supplied with the power supply voltage VDDC during operation of the liquid crystal display device 100, the liquid crystal display device 100 can be prevented from being affected by the static electricity through the inspection circuit 160. Thus, the display performance of the liquid crystal display device 100 is not degraded.

Again referring to FIG. 3, each TFT 164 has a source electrically connected to the other end of the corresponding data line 6a (i.e., remote from the end of the data line 6a electrically connected to the demultiplexer 7). The gates of the four TFTs 164 corresponding to the data lines 6a belonging to the same block are connected in common to receive the transfer pulse Xm assigned to the block.

More specifically, the gates of the TFTs 164 corresponding to the (4m−3)th, (4m−2)th, (4m−1)th, and (4m)th data lines 6a constituting the mth block are supplied in common with the transfer pulse Xm from the shift register 162.

In the first to 120th blocks, the drains of the TFTs 164 corresponding to the "a" data lines 6a are connected in common to the determination line 169, through which the output signal Cx1 is read out, of the four determination lines 169 whose number is the same as the data lines 6a constituting one block. Similarly, the drains of the TFTs 164 corresponding to the "b", "c", and "d" data lines 6a in the respective blocks are connected in common to the determination lines 169, through which the output signals Cx2, Cx3, and Cx4 are read out, respectively, of the four determination lines 169.

The detailed configuration of the connecting circuit 163 will now be described with reference to FIG. 7 to illustrate an operation for controlling conduction and non-conduction between the determination lines 169 and the data lines 6a through the connecting circuit 163. In the following description, for convenience of explanation, the control operation for controlling the conduction and non-conduction between one data line 6a and the corresponding determination line 169 which is electrically connected to the data line 6a will be described. The connecting circuit 163 also performs the same control operation on the other data lines 6a and the corresponding determination lines 169 in accordance with the transfer pulses Xm.

Referring to FIG. 7, the connecting circuit 163 includes the TFT 164 and the controlling circuit 190.

The source of the TFT 164 is electrically connected to the data line 6a and the drain thereof is electrically connected to the determination line 169.

The controlling circuit 190 includes a CMOS circuit 193 and a resistor R, the CMOS circuit 193 being composed of complementary transistors serving as an n-channel TFT 191 and a p-channel TFT 192.

The n-channel TFT 191 and the p-channel TFT 192 each have a gate electrically connected to the shift register 162 and one end of the resistor R. The other end of the resistor R is electrically connected to the power supply VDDY. The TFT 192 has a source electrically connected to the power supply VDDY. In this embodiment, the respective gates of the n-channel TFT 191 and the p-channel TFT 192 and the source of the TFT 192 are examples of an input terminal of the connection circuit. The potential at the source of the TFT 191 is set to a ground potential GND. It is preferable that the ground potential GND be the same as the ground potential GND of each scanning line driving circuit 104. For example, a common line held at the ground potential is disposed and is electrically connected to respective components to achieve ground potential matching therebetween, so that the operation can be stabilized.

An output of the CMOS circuit 193 is electrically connected to the gate of the TFT 164. The ON and OFF operations of the TFT 164 are controlled in response to signals S1 and S2 output from the CMOS circuit 193 during inspection of the liquid crystal display device 100 and during operation thereof, respectively, so that the conduction and non-conduction between the data line 6a and the determination line 169 are controlled.

The operation of controlling the conduction and non-conduction between the determination line 169 and the data line 6a by the connecting circuit 163 will now be described with reference to FIG. 7.

Referring to FIG. 7, during operation of the liquid crystal display device 100, namely, for a period during which the liquid crystal display device 100 displays an image, the transfer pulse Xm is not supplied from the shift register 162 to the input terminal of the CMOS circuit 193. Accordingly, the TFT 191 is in the ON state, so that the signal S1 having the same potential as the ground potential GND is supplied through the TFT 191 to the gate of the TFT 164. At that time, the gate voltage applied between the source and the gate of the TFT 164 is lower than a threshold voltage Vth at which the TFT 164 is operable. Accordingly, the TFT 164 is turned off, thus resulting in the non-conduction between the data line 6a and the determination line 169. Therefore, the inspection circuit 160 can be electrically disconnected from the data lines 6a during operation of the liquid crystal display device 100. Even when the operation of the inspection circuit 160 is unstable, the display performance of the liquid crystal display device 100 in image display is not degraded.

On the other hand, during inspection of the liquid crystal display device 100, the transfer pulse signal Xm having a negative potential that is opposite to a positive potential of the power supply voltage VDDY is supplied from the shift register 162 to the input terminal of the CMOS circuit 193, so that the TFT 191 is turned off and the TFT 192 is turned on. Consequently, during inspection of the liquid crystal display device 100, the signal S2 having a potential with the same polarity as that of the power supply voltage VDDY is supplied from the source of the TFT 192 to the gate of the TFT 164 in response to the transfer pulse signal Xm, so that the TFT 164 is turned on. Therefore, during inspection of the liquid crystal display device 100, the gate line 6a and the determination line 169 are brought into conduction through the TFT 164, so that an output signal Cx output from the pixel unit 700 can be output to the external determination circuit through the determination line 169. Thus, the pixel unit 700 can be inspected.

According to this embodiment, therefore, since the inspection circuit 160 can be electrically disconnected reliably from the data lines 6a during operation of the liquid crystal display device 100, the display performance of the liquid crystal display device 100 can be prevented from being degraded due to a malfunction of the inspection circuit 160.

During inspection of the liquid crystal display device 100, the inspection circuit 160 allows the shift register 162 to output the transfer pulses X1, X2, . . . , and X120 to the blocks of the data lines 6a, respectively, thereby turning on the TFTs 164 corresponding to the respective blocks. Thus, signals indicating potentials of the respective data lines 6a, which have been supplied with a data signal having a predetermined voltage, are output to the four determination lines 169. The external determination circuit electrically connected to the four determination lines 169 determines whether the four determination lines 169 have a predetermined potential, namely, the potentials of the output signals Cx, so that the quality of the demultiplexer 7 and those of the data lines 6a can be inspected.

As described above, the inspection circuit 160 according to this embodiment can inspect the liquid crystal display device 100 and can also reduce its power consumption. In addition, a display defect of the liquid crystal display device 100 caused by a malfunction can also be reduced. The display performance of the liquid crystal display device 100 can be increased higher than that in a case where the scanning line driving circuits 104 and the shift register 162 share a power supply circuit.

Electronic Apparatus

Figure 8:
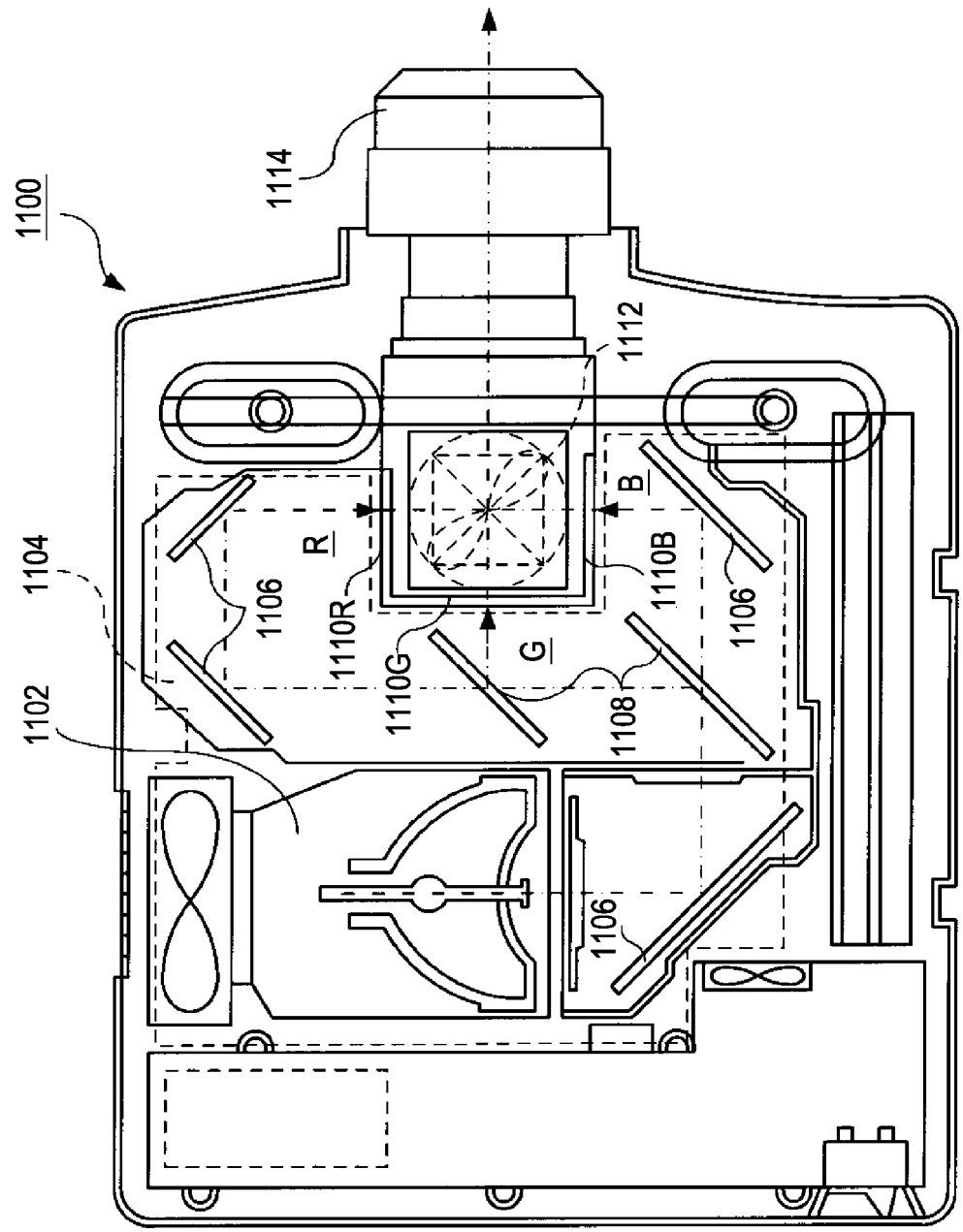
FIG. 8 is a plan view of the structure of a projector according to an embodiment, the projector serving as an example of an electronic apparatus including an electro-optic device according to the embodiment.

A projector including a liquid crystal display device with the above-described structure will now be described with reference to FIG. 8. FIG. 8 is a plan view of the projector according to an embodiment. The projector according to this embodiment uses the above-described liquid crystal display device as a light valve.

Referring to FIG. 8, the projector, indicated at 1100, has therein a lamp unit 1102 including a white light source such as a halogen lamp. Light emitted from the lamp unit 1102 is split into light beams of three primary colors, i.e., red (R), green (G), and blue (B) by four mirrors 1106 and two dichroic mirrors 1108 arranged in a light guide 1104. The three light beams enter liquid crystal panels 1110R, 1110B, and 1110G, respectively. Each liquid crystal panel serves as a light valve for the corresponding primary color light beam.

The liquid crystal panels 1110R, 1110B, and 1110G have the same structure as that of the above-described liquid crystal display device. These liquid crystal panels are driven in accordance with R, G, and B primary color signals supplied from respective data signal processing circuits. The light beams, modulated by the liquid crystal panels, traveling in three different directions enter a dichroic prism 1112. In the dichroic prism 1112, the R and B light beams are refracted at an angle of 90 degrees and the G light beam travels straight. Accordingly, images of the respective color light beams are combined into one image, so that the resultant color image is projected through a projection lens 1114 onto a screen.

Regarding images displayed by the respective liquid crystal panels 1110R, 1110B, and 1110G, it is necessary that the image displayed by the liquid crystal panel 1110G be reversed left to right relative to the images displayed by the liquid crystal panels 1110R and 1110B.

Since the respective liquid crystal panels 1110R, 1110G, and 1110B receive the light beams corresponding to the three primary colors, R, G, and B through the dichroic mirrors 1108, each liquid crystal panel does not need a color filter.

In addition to the electronic apparatus described with reference to FIG. 8, examples of the electronic apparatus include a mobile personal computer, a mobile phone, a liquid crystal television, view-finder type and monitor-direct-view type video tape recorders, a car navigation system, a pager, an electronic organizer, an electronic calculator, a word processor, a workstation, a video phone, a POS terminal, and an apparatus with a touch panel. As a matter of course, the invention is applicable to these various electronic apparatuses.

The invention can be applied not only to the liquid crystal display device described in the foregoing embodiment but also to a reflective liquid crystal (liquid crystal on silicon or LCOS) display device in which elements are arranged on a silicon substrate, a plasma display panel (PDP), field emission type displays (FED and SED), an organic EL display, a digital micro-mirror device (DMD), and an electrophoresis device.

The invention is not limited to the above-described embodiments and many modifications and variations are possible without departing from the spirit and scope of the invention as defined in the appended claims and in the specification. The technical scope of the invention also includes such a modified inspection circuit and electro-optic device and an electronic apparatus including the modified electro-optic device.

What is claimed is:

1. An electro-optic device comprising:
   a substrate;
   a data line;
   a scanning line intersecting the data line;
   a pixel portion disposed so as to correspond to the intersection of the data line and the scanning line;
   a driving circuit supplying a signal to the scanning line, the driving circuit being disposed along a first side of the substrate;
   a first terminal portion that supplies a first power supply voltage to the driving circuit;
   a second terminal portion that supplies a second power supply voltage;
   an inspection line for electrical connection with an external inspection unit; and
   an inspection circuit electrically connected to the inspection line, the inspection circuit being disposed along a second side that intersects the first side of the substrate, the inspection circuit including:
      a connection circuit electrically connecting the inspection line to the data line when the first power supply voltage is not supplied to the driving circuit, the connection circuit also electrically disconnecting the inspection line from the data line when the first bower supply voltage is supplied to the driving circuit; and
      a supply circuit supplying a control signal for controlling conduction between the data line and the inspection line to the connection circuit, the supply circuit being driven using the second power supply voltage.

2. The electro-optic device according to claim 1, wherein the connection circuit includes:
   a transistor electrically connected between the data line and the inspection line; and
   a control circuit having an input terminal electrically connected to the first power supply voltage and the supply circuit and an output terminal electrically connected to the gate of the transistor.

3. The electro-optic device according to claim 1, wherein the inspection line includes a line for determination electrically connected to a determination unit determining the quality of the pixel portion.

4. An electronic apparatus comprising the electro-optic device according to claim 1.

5. The electro-optic device according to claim 1, wherein the first terminal portion supplies the first power supply voltage to the driving circuit so as to display an image in the pixel portion during operation of the electro-optic device, and wherein the supply circuit is not electrically connected to the connection circuit during operation of the electro-optic device.

6. The electro-optic device according to claim 1, further comprising:
   a data signal supply circuit supplying a data signal to one end of the data line,
   wherein the inspection circuit is electrically connected to another end of the data line.

* * * * *